United States Patent
Hudis et al.

(10) Patent No.: US 10,771,492 B2
(45) Date of Patent: Sep. 8, 2020

(54) ENTERPRISE GRAPH METHOD OF THREAT DETECTION

(71) Applicant: Microsoft Technology Licensing, LLC., Redmond, WA (US)

(72) Inventors: Efim Hudis, Bellevue, WA (US); Michal Braverman-Blumenstyk, Hod Hasharon (IL); Daniel Alon, Tel Mond (IL); Hani Hana Neuvirth, Tel Aviv (IL); Royi Ronen, Tel Aviv (IL); Yuri Gurevich, Edmonds, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 187 days.

(21) Appl. No.: 15/273,604

(22) Filed: Sep. 22, 2016

(65) Prior Publication Data
US 2018/0084001 A1    Mar. 22, 2018

(51) Int. Cl.
*H04L 29/06* (2006.01)
*G06F 16/901* (2019.01)
*G06F 21/57* (2013.01)

(52) U.S. Cl.
CPC ...... *H04L 63/1433* (2013.01); *G06F 16/9024* (2019.01); *G06F 21/577* (2013.01); *H04L 63/14* (2013.01); *H04L 63/1408* (2013.01)

(58) Field of Classification Search
CPC . H04L 63/1433; H04L 63/14; H04L 63/1408; G06F 17/30958; G06F 21/577
USPC .......................................................... 726/25
See application file for complete search history.

(56) References Cited

U.S. PATENT DOCUMENTS

| | | | |
|---|---|---|---|
| 7,352,280 B1 | 4/2008 | Rockwood | |
| 7,530,105 B2 | 5/2009 | Gilbert et al. | |
| 7,624,448 B2 | 11/2009 | Coffman | |
| 7,644,365 B2 | 1/2010 | Bhattacharya et al. | |
| 7,873,595 B2* | 1/2011 | Singh ............... | G06Q 10/00 707/603 |
| 7,950,058 B1 | 5/2011 | Rockwood | |
| 8,504,504 B2 | 8/2013 | Liu | |
| 8,813,228 B2 | 8/2014 | Magee et al. | |
| 9,043,905 B1 | 5/2015 | Allen et al. | |
| 9,106,689 B2 | 8/2015 | Steinbrecher et al. | |

(Continued)

FOREIGN PATENT DOCUMENTS

AU    2016202184 B1    9/2016

OTHER PUBLICATIONS

"International Search Report and Written Opinion Issued in PCT Application No. PCT/US2017/051436", dated Dec. 1, 2017,11 Pages.

(Continued)

*Primary Examiner* — Jahangir Kabir

(57) ABSTRACT

Systems and methods for analyzing security alerts within an enterprise are provided. An enterprise graph is generated based on information such as operational intelligence regarding the enterprise. The enterprise graph identifies relationships between entities of the enterprise and a plurality of security alerts are produced by a plurality of security components of the enterprise. One or more significant relationships are identified between two or more of the plurality of security alerts based on a strength of a relationship identified in the enterprise graph. A significant relationship is utilized to identify a potential security incident between two or more of the security alerts.

18 Claims, 6 Drawing Sheets

(56) References Cited

U.S. PATENT DOCUMENTS

| | | | |
|---|---|---|---|
| 9,124,621 B2 | 9/2015 | Manadhata et al. | |
| 9,141,790 B2 | 9/2015 | Roundy et al. | |
| 9,166,997 B1 | 10/2015 | Guo et al. | |
| 9,225,730 B1* | 12/2015 | Brezinski | G06F 21/00 |
| 9,350,757 B1* | 5/2016 | Falkowitz | H04L 63/145 |
| 9,740,506 B2* | 8/2017 | Ren | G06F 9/451 |
| 10,289,966 B2* | 5/2019 | Daher | G06Q 10/02 |
| 2003/0154269 A1* | 8/2003 | Nyanchama | H04L 63/1433 709/223 |
| 2004/0003398 A1* | 1/2004 | Donian | G06F 21/10 725/34 |
| 2007/0192859 A1* | 8/2007 | Shahar | G06F 21/552 726/22 |
| 2007/0294292 A1* | 12/2007 | Hydrie | G06F 17/30053 |
| 2010/0125663 A1* | 5/2010 | Donovan | G06F 21/552 709/224 |
| 2010/0242114 A1* | 9/2010 | Bunker | G06F 21/577 726/25 |
| 2012/0137367 A1* | 5/2012 | Dupont | G06F 21/00 726/25 |
| 2013/0055404 A1* | 2/2013 | Khalili | G06Q 10/00 726/25 |
| 2015/0074806 A1* | 3/2015 | Roundy | G06F 21/55 726/23 |
| 2015/0242637 A1* | 8/2015 | Tonn | G06F 21/577 726/25 |
| 2015/0244734 A1* | 8/2015 | Olson | G06F 21/577 726/25 |
| 2015/0310195 A1 | 10/2015 | Bailor et al. | |
| 2016/0162690 A1* | 6/2016 | Reith | G06F 21/577 726/25 |
| 2016/0191549 A1* | 6/2016 | Nguyen | G06F 11/00 726/23 |
| 2016/0205122 A1* | 7/2016 | Bassett | G06F 21/577 726/23 |
| 2016/0350685 A1* | 12/2016 | Helbing | G06Q 30/02 |
| 2017/0286690 A1* | 10/2017 | Chari | G06F 21/577 |
| 2017/0289187 A1* | 10/2017 | Noel | H04L 63/1433 |
| 2018/0255067 A1* | 9/2018 | Maguire | H04L 63/102 |

OTHER PUBLICATIONS

Game, et al., "Graph-based Attack Detection in Cloud using KDD CUP 99 Dataset", In International Journal of Science and Research, vol. 3, Issue 8, Aug. 2014, pp. 511-516.

"CrowdStrike Introduces New Capabilities to Help Customers Stop Breaches", Published on: Feb. 24, 2016 Available at: http://www.crowdstrike.com/resources/crowdstrike-introduces-new-capabilities-to-help-customers-stop-breaches/.

"Microsoft Advanced Threat Analytics", Retrieved on: May 26, 2016 Available at: https://www.microsoft.com/en-us/server-cloud/products/advanced-threat-analytics/overview.aspx.

* cited by examiner

ENTERPRISE GRAPH METHOD OF THREAT DETECTION

BACKGROUND

Cloud computing and storage solutions provide enterprises with various capabilities to store and process data. However, there are security concerns associated with cloud computing and enterprise networks. The infrastructure must be properly configured, managed and secured, and the data and applications must also be protected. An efficient security architecture should recognize and address issues that arise but that is not always the case. Although the number of security attacks detected every day have increased with the use of security information and event management (SIEM) software tools and services, the significance of any one attack is not easily discerned. The deluge of attacks alone often precludes IT professions from ascertaining which attacks are the most significant. Moreover, the security logs, alerts and other virtual machine (VM) and network data logged for security purposes via SIEM often lose their functional context as to what machines or appliances produced them which further obscures the significance of many of the attacks.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

According to one aspect disclosed herein, a method is presented for analyzing security alerts. The method disclosed herein includes generating an enterprise graph based on information associated with an enterprise. The enterprise graph is utilized to identify relationships between computers of the enterprise. Upon receiving a plurality of security alerts produced by security components of the enterprise, at least one significant relationship is identified between two or more of the security alerts based on a strength of a relationship identified in the enterprise graph. The method then includes identifying at least one potential security incident based on the at least one significant relationship between the two or more of the plurality of security alerts. The method may also include examining the security alerts associated with the at least one potential security incident to identify at least one known part of an attack.

According to another aspect disclosed herein, a system is presented for analyzing security alerts. The system disclosed herein includes an enterprise graph service for generating an enterprise graph based on information associated with an enterprise for identifying relationships between computers of the enterprise. A plurality of security components generate a plurality of security alerts regarding the enterprise and then a fusion service identifies significant relationships between security alerts, wherein each significant relationship is identified in the enterprise graph and corresponds with at least two or more security alerts. The system also includes a kill chain interpreter for identifying potential security incidents based on significant relationships between two or more of the security alerts. The system may also include a list prioritizing the security alerts corresponding with the potential security incidents identified by the kill chain interpreter and a recommendation that the security alerts of one or more of the potential security incidents be given priority over other security alerts not associated with any other identified potential security incident.

According to yet another aspect disclosed herein, a computer-readable storage medium including instructions for analyzing security alerts is presented. The instructions executed by a processor include generating an enterprise graph based on information associated with an enterprise, utilizing the enterprise graph to identify relationships between computers of the enterprise, and receiving a plurality of security alerts produced by a plurality of security components of the enterprise. The instructions also include identifying at least one significant relationship between two or more of the security alerts based on a strength of a relationship identified in the enterprise graph and identifying a potential security incident involving two or more entities of the enterprise based on the at least one significant relationship between the two or more of the security alerts, wherein the potential security incident corresponds with at least part of a known piece of malicious executable code. The instructions then also include indicating the plurality of security alerts of the potential security incident have priority over other security alerts not associated with the identified potential security incident and concluding that the potential security incident is an actual attack.

Examples are implemented as a computer process, a computing system, or as an computer program product for one or more computers. According to an aspect, the computer program product is a server of a computer system having a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
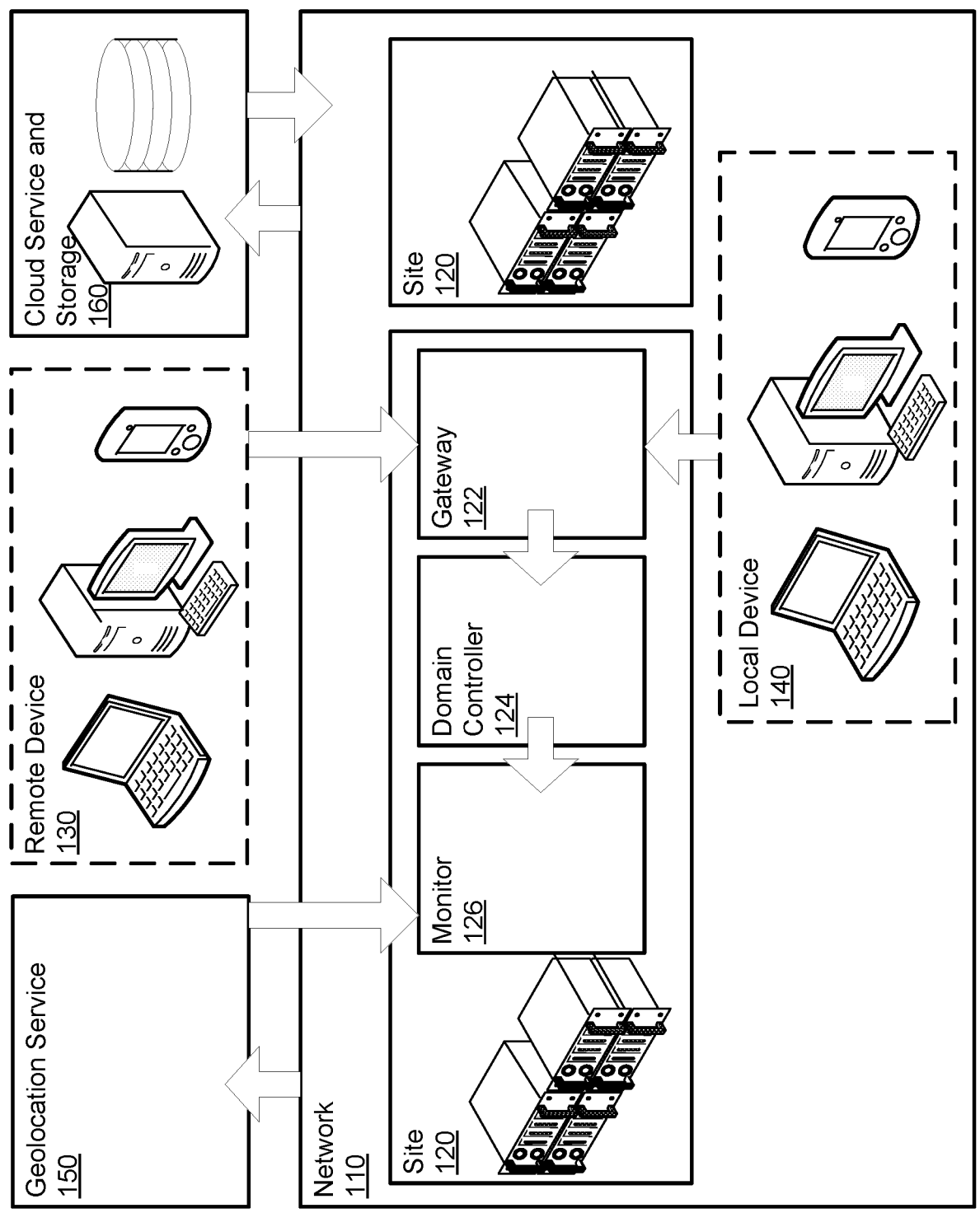
FIG. 1 illustrates an example environment having an enterprise network utilized in various aspects.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

FIG. 1 illustrates an example computing environment 100 in which the present disclosure may be practiced. As illustrated, an enterprise such as enterprise network 110 is divided into multiple sites 120. A given site 120 may be accessed remotely by a remote device 130, which is located externally to the enterprise network 110 or remotely from the sites 120, or may be accessed locally by a local device 140, which is located internally to the enterprise network 110 or locally to the sites 120. The enterprise network 110 is in communication with a geolocation service 150 to provide locational data for the remote devices 130. Although two sites 120, one remote device 130, and one local device 140 are illustrated, the number of sites 120, remote devices 130, and local devices 140 may be greater than or less than what is illustrated in the example environment 100.

The enterprise network 110 provides a single operating environment over which computing devices may interact despite being spread across multiple sites 120 and domains (e.g., for a company, a governmental agency, an educational institution spread over a large geographical area). Each site 120 of the enterprise network 110 includes: a gateway 122, operable to accept communications from devices connecting to the site 120; a domain controller 124, which is in communication with the gateway 122 and operable to authenticate entities seeking to access the enterprise network 110; and a monitor 126, in communication with the domain controller 124, and operable to aggregate connection information from the remote devices 130 to manage entity location data. Gateways 122 and domain controllers 124 will be understood by one of skill in the art to include hardware devices and software running on those devices to provide the functionalities thereof. In various aspects, the monitor 126 may be run on dedicated hardware or may be provided via software on a computing device used for several purposes, such as, for example, on the same hardware as the domain controller 124. In additional aspects, the enterprise network 110 may make use of fewer monitors 126 than sites 120; some or all of the sites 120 may share a monitor 126.

The remote device 130 and local device 140 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers.

Remote devices 130 and local device 140 are operated by users, who may be humans or automated systems (e.g., "bots") that request connections to one or more sites 120 of the enterprise network 110. For example, an instance of the SIRI®, GOOGLE NOW™ or CORTANA® electronic assistant (available from Apple, Inc. of Cupertino, Calif.; Alphabet, Inc. of Mountain View, Calif.; and Microsoft, Corp. of Redmond, Wash., respectively) may request a connection in response to or in anticipation of queries from a human user.

The remote device 130 and local devices 140 access the enterprise network 110 by being authenticated by a domain controller 124 of a site 120. Remote devices 130 may connect to a given site 120 via a Virtual Private Network (VPN) connection or other tunnel to initiate a session, whereas local devices 140 connect to the site 120 at which they are located. Whether a given device is a remote device 130 or a local device 140 depends on how it connects to the enterprise network 110, and a given device may be both a remote device 130 and a local device 140. For example, a user may use a local device 140 while in the office to connect locally to the enterprise network 110 and take that device home and log into the enterprise network 110, making the device a remote device 130 for the remote session. Entities (devices or user accounts) connect to a given site 120 which is then noted and mapped by either the domain controller 124 or the monitor 126 as using the given site 120. Local devices 140 may also have their connection attempts to the domain controller 124 and activity session logged by the monitor 126 for security purposes.

Figure 2:
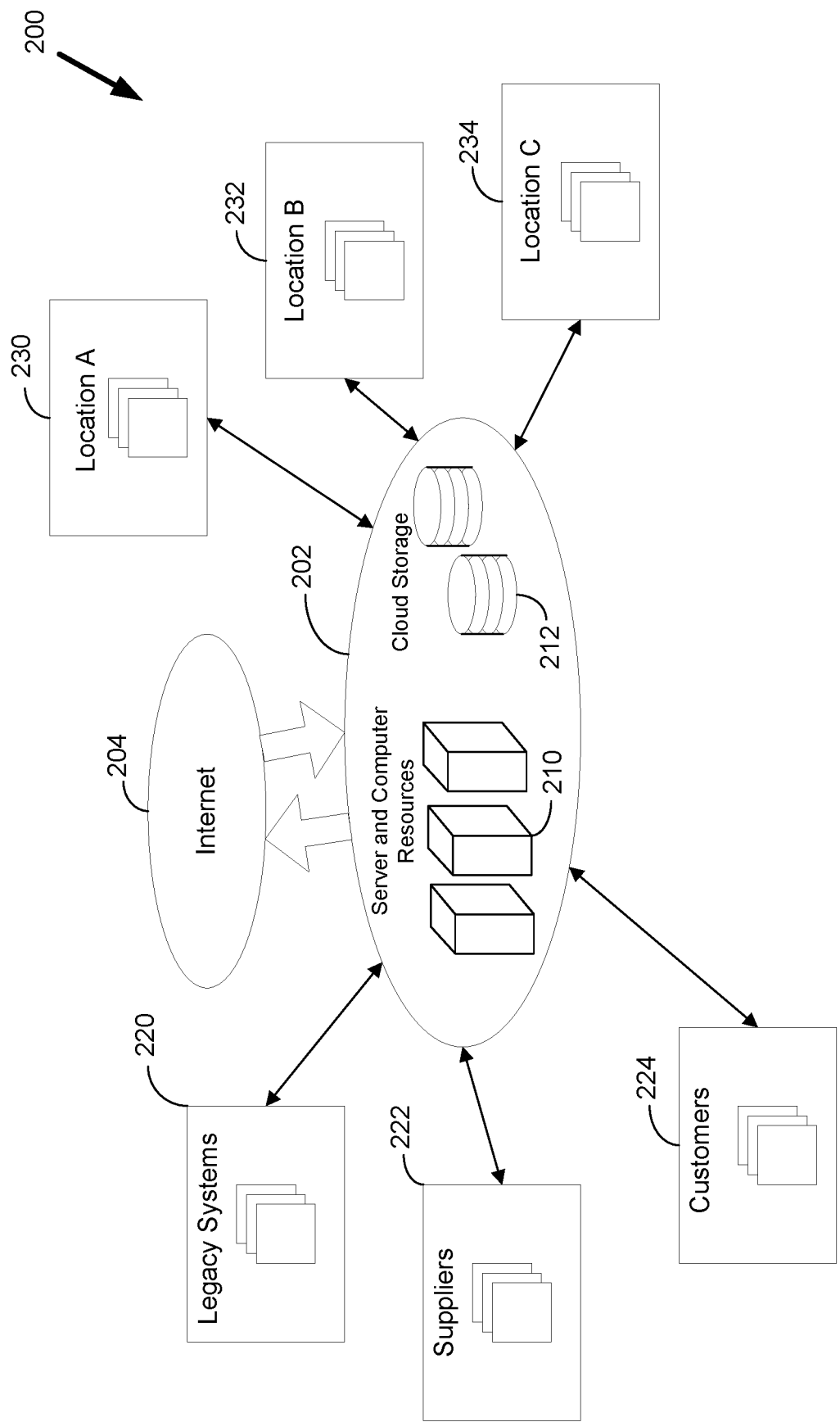
FIG. 2 illustrates an example environment of cloud-based enterprise network utilized in various aspects.

Other configurations of computing environments may also be used where tasks are performed by computing devices that are linked through a communications network. FIG. 2 illustrates another example computing environment 200 in which the present disclosure may be practiced. As illustrated, an enterprise such as cloud network 202 with cloud 202 accessing the internet 204. The cloud 202 having shared processing resources and data provided by server and computer resources 210 and cloud storage 212 for providing users within the enterprise with various capabilities. The enterprise within the environment 200 is divided up amongst the cloud 202, enterprise legacy systems 220, enterprise suppliers 222, enterprise customers 224 and various enterprise locations such as locations A-C having reference numbers 230, 232, and 234, respectively. However, the enterprise may include fewer or more locations such as locations A-C. In one or more embodiments, a location maybe the headquarters of the enterprise company and other locations may be branch offices. Also, one or more locations may be remote users of the enterprise accessing the cloud 202.

Also, the cloud 202 may be referred to as a virtual device/machine cloud made up of one or more virtual device/machines. The virtual machines are software representations of hardware devices such as computers as understood by those skilled in the art. Also, each of the locations A-C, the legacy systems 220, suppliers 222 and customers 224 of the enterprise may have one or more entities referred to as machines such as an actual computer or server. The machines also may instead be virtual computers. Although the enterprise computing environment 100 of FIG. 1 may depict particular devices, each of the remote and local devices 130, 140, the machines at sites 120 within the network 110, as well as the server/computer resources of the cloud 160, may be referred to as an entity or machine and be an actual hardware computing device such as a computer or server or may instead be a virtual device/machine.

Figure 3:
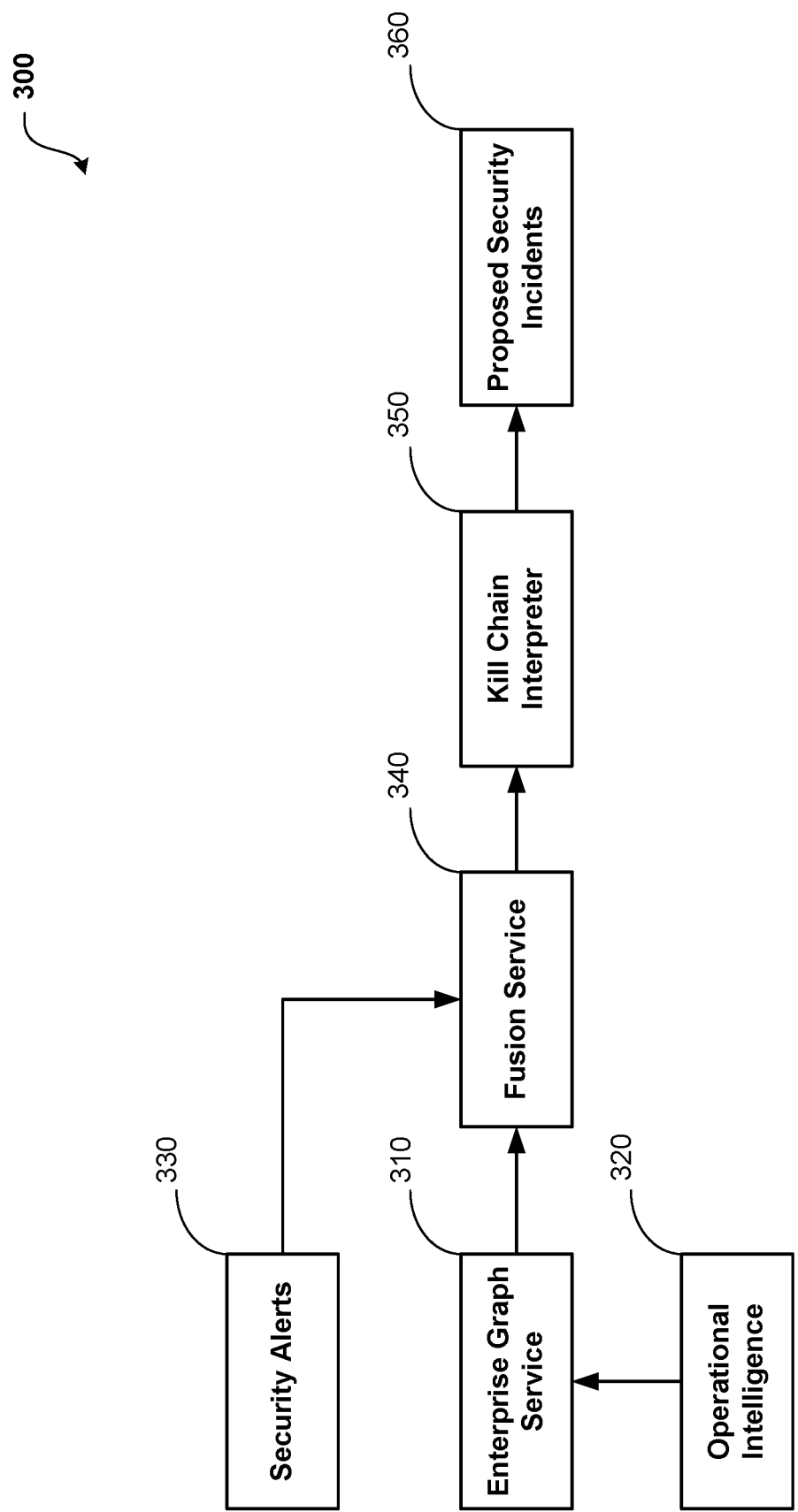
FIG. 3 illustrates an exemplary system for analyzing security alerts within an enterprise according to various aspects.

FIG. 3 illustrates an exemplary system 300 for analyzing security alerts within various enterprise computing environments. The system 300 includes a service for generating and maintaining an enterprise graph 310. The enterprise graph 310 is generated based on information such as operational intelligence 320 associated with or derived from the architecture and the functions performed within the enterprise network. Thus, the enterprise graph 310 is a compilation of all the relationships between machines within the corporate enterprise and is utilized to identify relationships between machines of the enterprise.

The system for analyzing alerts also includes a fusion service 340 for fusing related security alerts 330 together. Security alerts 330 produced by security components/solutions within the network 110 of the enterprise are received and stored by the fusion service 340. The fusion service 340 analyzes the security alerts 330 and performs statistical calculations to identify significant relationships between two or more of the security alerts 330 based on the strength of particular relationships between machines within the network 110 of the enterprise. Relationships may be determined to be significant relationships based on the type of machines or where machines are located within the enterprise. For example, a significant relationship may be based on the physical distance or network connectivity between particular machines. Also, a significant relationship may exist between machines running the same application or performing the same functions. Other significant relationships may exist as a result of the frequency of security alerts 330 between particular machines or because of the type of security alerts 330 concerning particular machines. If a significant relationship is identified by the fusion service 340, a potential security incident 360 may be identified based on the existence of the significant relationship between multiple security alerts 330.

Also, multiple significant relationships can result in one or more potential security incidents 360. A potential security incident 360 based on one or more significant relationships between two or more security alerts 330 may involve two or more machines of the network of the enterprise. For example, the security alerts 330 of a particular potential security incident 360 could be from two computing devices within the same premises or running the same application. Also, a piece of known malicious executable code could be detected at one or more machines resulting in a security alert 330. A single security alert 330 occurring as a result of detecting malicious executable code could result in a potential security incident 360. A security alert 330 could also occur as a result of one or more machines receiving the known piece of malicious executable code such as from another machine within the network or from outside the network. In one embodiment, a security alert 330 occurring as a result of detecting a known piece of malicious executable code and another security alert 330 occurring as a result of receiving that known piece of malicious executable code together could result in a potential security incident 360.

If more than one potential security relationship is identified, each may be ranked or prioritized relative one another based on how significant each relationship is or based on how many significant relationships are associated with a particular potential security incident 360. Thus, a list of potential security incidents 360 can be generated. Also, the security alerts 330 of any potential security incident 360 would have priority over other security alerts 330 that are not associated with any identified potential security incident 360. A priority list of the security alerts 330 that are associated with or are based on potential security incidents 360 can be generated. The security alerts 330 of the potential security incidents 360 can be recommended to be given investigative priority via a priority list so that the IT specialists know where to focus their work.

The system 300 also includes a kill chain interpreter 350 as shown in FIG. 3 for identifying potential security incidents 360. The kill chain interpreter 350 identifies potential security incidents 360 based on significant relationships that are found to exist between two or more security alerts 330. It is understood by those skilled in the art of analyzing security alerts 330, that attacks typically include known stages. Thus, stages of attacks may come at different times and occur at different locations or machines. Then in accordance with one or more embodiments, the security alerts 330 may be arranged or presented to correspond with likely stages of an attack and therefore define a chain of events that meets the criteria for an actual attack that should be investigated. In other words, examining the security alerts 330 associated with one or more potential security incidents 360 could lead to identifying at least one or more known parts of, or all of, an attack. Examining several security alerts 330 associated with one or more potential security incidents 360 could identify at least one know part or all of an attack by comparing the chain of events, defined by the several security alerts 330, with the criteria for an attack. If the chain of events of several security alerts 330 of a potential security incident 360 correspond with the criteria for an attack then it may be concluded that the potential security incident 360 is an actual attack.

Figure 4:
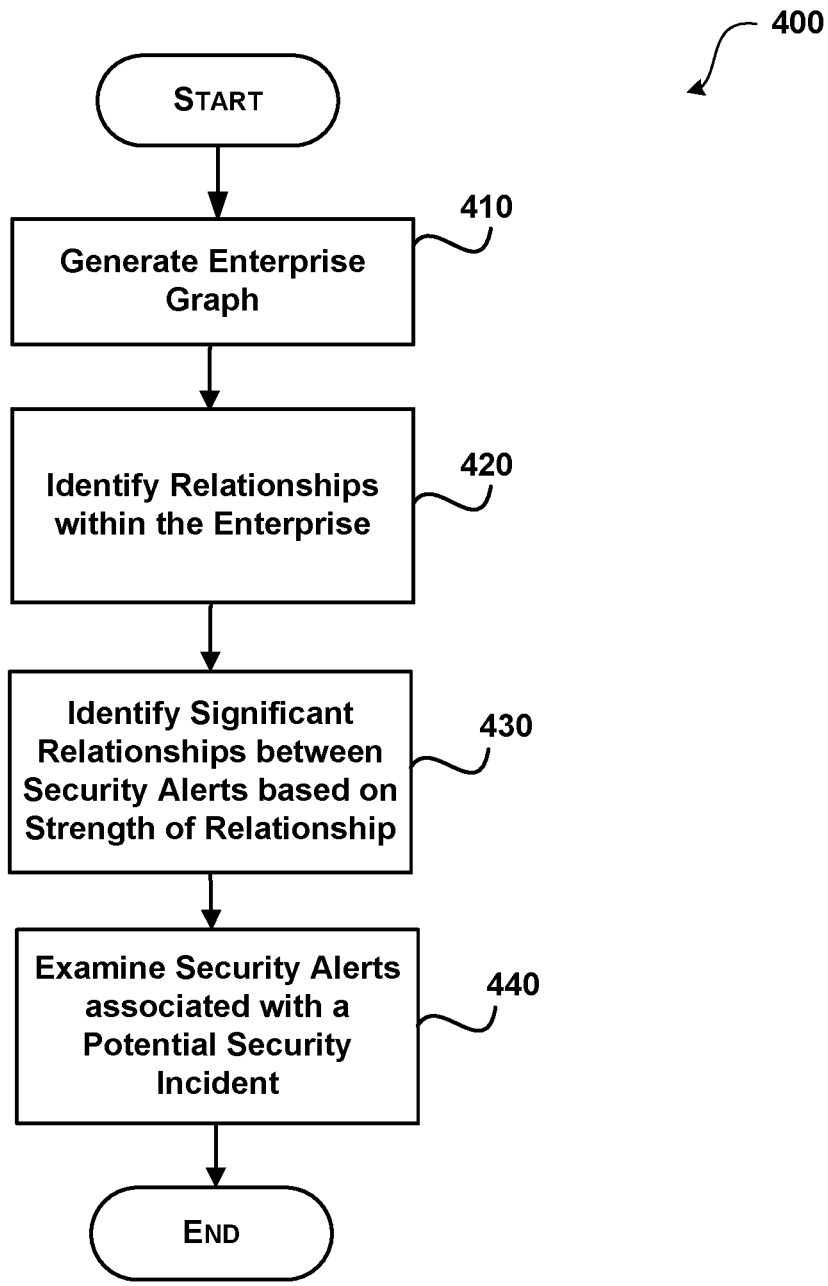
FIG. 4 illustrates a flowchart showing general stages involved in analyzing security alerts within an enterprise with the system of FIG. 3.

The use of the system 300 as described above to investigate security alerts constitutes an inventive method in addition to the system 300 itself. In practicing the method 400 of analyzing security alerts as illustrated in FIG. 4, the steps include process block 410 for generating the enterprise graph 310 based on the information such as operation intelligence 320 derived from the architecture of the network and/or the operations performed over the network. At process block 420 the enterprise graph is used to identify relationship within the network of the enterprise based on the architecture and functions performed over the network. Security alerts 330 produced by security components/solutions within the network are received at a fusion service 340. The fusion service 340 fuses related security alerts together in order to identify significant relationships based on strengths of relationships identified in the enterprise graph 310 as shown in process block 430. Potential security incidents could be based on a significant relationship between two or more security alerts.

The method 400 also includes process block 440 for examining the security alerts 330 associated with a potential security incident 360. For example, examination of the security alerts 330 may lead to identification of a known part of, or all of, a security attack. It is to be understood that additional operations may be performed between the process steps mentioned here or in addition to those steps.

Figure 5:
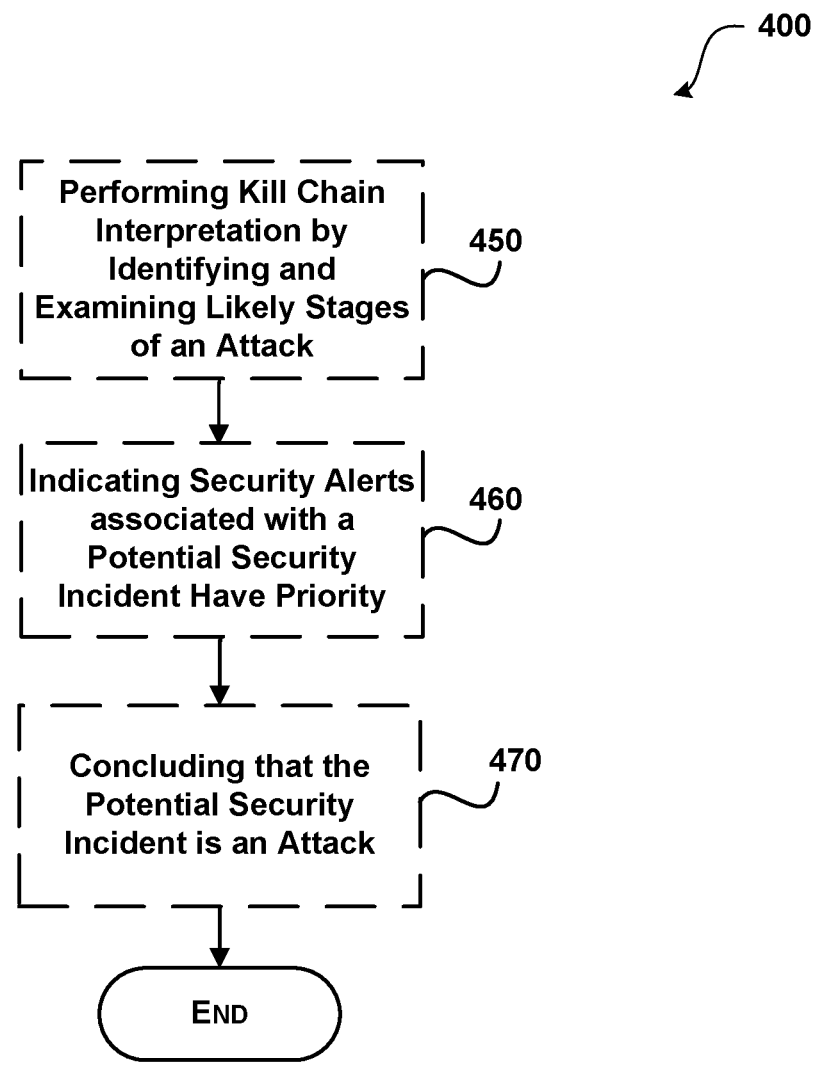
FIG. 5 illustrates optional stages to the flowchart of FIG. 4 for analyzing security alerts with the system of FIG. 3.

The method 400 may also include one or more of the steps shown in FIG. 5. Thus, the method 400 may also include process block 450 for performing kill chain interpretation. For example, security alerts may correspond with likely states of an attack that should be examined in order to identify all or part of an actual attack. The method 400 may also include process block 460 for indicating security alerts 330 associated with a potential security incident 360 have priority, for example, over other security alerts 330 that are not associated with a potential security incident 360. The method 400 may also include process block 470 for concluding that the potential security incident 360 is a real attack.

Embodiments, for example, are described above with reference to block diagrams and/or operational illustrations of methods, systems, and computer program products according to embodiments. The functions/acts noted in the blocks may occur out of the order as shown in any flowchart or described herein with reference to the Figures. For example, two steps or processes shown or described in succession may in fact be executed substantially concurrently or the blocks may sometimes be executed in the reverse order, depending upon the functionality/acts involved.

Figure 6:
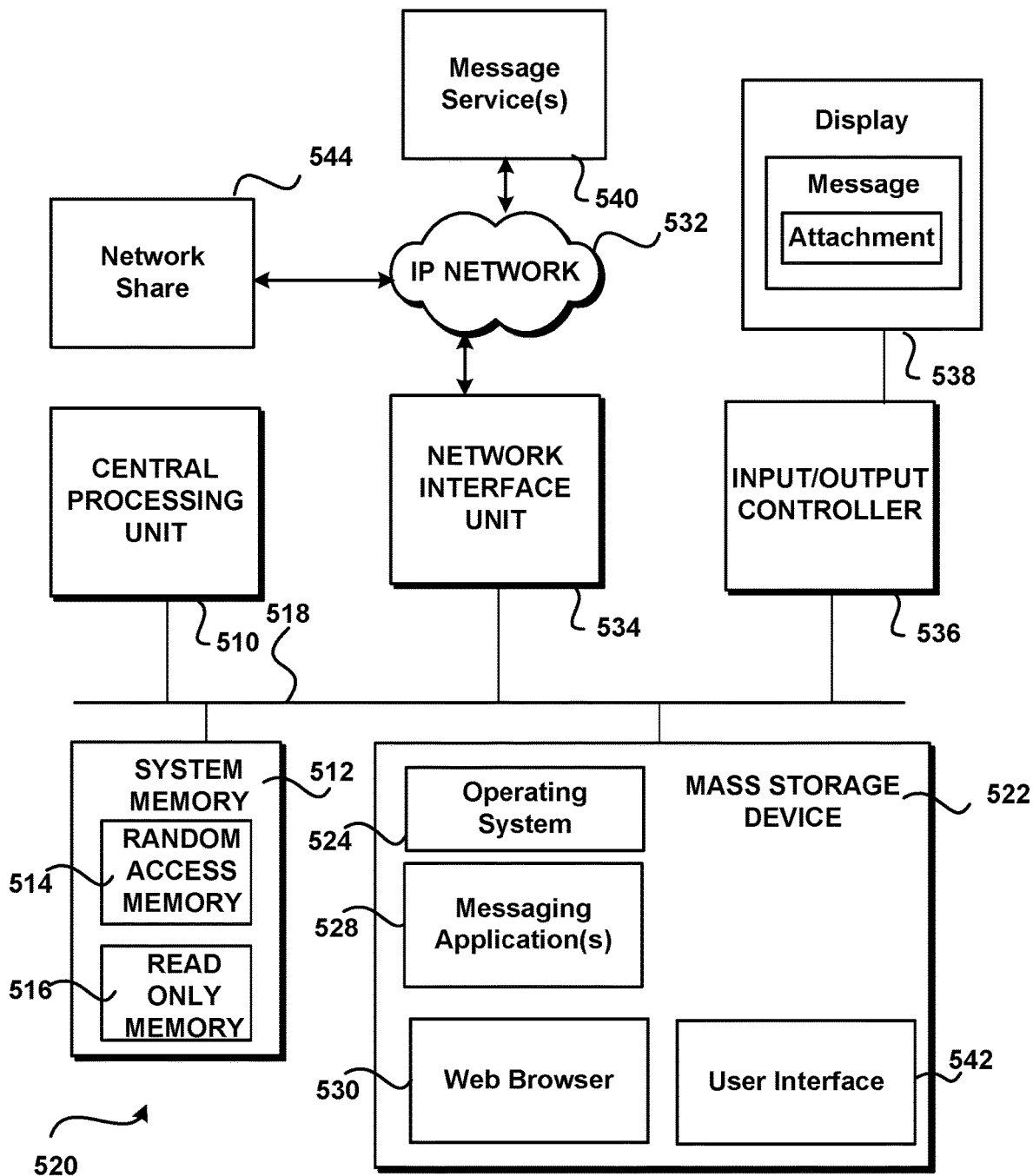
FIG. 6 illustrates an exemplary embodiment of physical components for a device/computer utilized in the various embodiments.

FIG. 6 and the corresponding discussion are intended to provide a brief, general description of a suitable computing environment in which embodiments may be implemented. Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Still referring to FIG. 6, an illustrative computer environment for a computer 520 utilized in the various embodiments will be described. The computer environment shown in FIG. 6 includes computing devices that each may be configured as a mobile computing device (e.g. phone, tablet, net book, laptop), server, a desktop, or some other type of computing device and include a central processing unit 510 ("CPU"), a system memory 512, including a random access memory 514 ("RAM") and a read-only memory ("ROM") 516, and a system bus 518 that couples the memory to the CPU 510.

A basic input/output system containing the basic routines that help to transfer information between elements within the computer, such as during startup, is stored in the ROM 516. The computer 520 further includes a mass storage device 522 for storing an operating system 524, attachment manager 526, messaging application 528 and web browser 530.

The mass storage device 522 is connected to the CPU 10 through a mass storage controller (not shown) connected to the bus 518. The mass storage device 522 and its associated computer-readable media provide non-volatile storage for the computer 520. Although the description of computer-readable media contained herein refers to a mass storage device, such as a hard disk or CD-ROM drive, the computer-readable media can be any available media that can be accessed by the computer 520.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 520.

Computer 520 operates in a networked environment using logical connections to remote computers through a network 532, such as the Internet. The computer 520 may connect to the network 532 through a network interface unit 534 connected to the bus 518. The network connection may be wireless and/or wired. The network interface unit 534 may also be utilized to connect to other types of networks and remote computer systems. The computer 520 may also include an input/output controller 536 for receiving and processing input from a number of other devices, including a keyboard, mouse, or electronic stylus (not shown). Similarly, the input/output controller 536 may provide input/output to a scanner, a camera, a display screen 538, a printer, or other type of input and/or output device. Display 538 is configured to display representations of the messages received via the messaging application 528.

As mentioned briefly above, a number of program modules and data files may be stored in the mass storage device 522 and RAM 514 of the computer 520, including an operating system 524 suitable for controlling the operation of a computer, such as the WINDOWS 10®, WINDOWS 10 Mobile®, or WINDOWS SERVER® operating system from MICROSOFT CORPORATION of Redmond, Wash. The mass storage device 522 and RAM 514 may also store one or more program modules. In particular, the mass storage device 522 and the RAM 514 may store one or more application programs, including one or messaging applications 528 and Web browser 530.

User interface 542 is used by a user to interact with applications and documents. Messaging application 528 may be one or more different messaging applications. For example, the computing device may include an email application, an Instant Messaging (IM) application, an SMS, MMS application, a real-time information network (e.g. Twitter® interface), a social networking application, and the like. According to an embodiment, messaging application 528 is an email application, such as MICROSOFT OUTLOOK®. The messaging application(s) may be client based and/or web based. For example, a network based message service 540 may be used, such as: MICROSOFT WINDOWS LIVE or some other network based email and messaging service.

Network share 544 is configured to store content (e.g. documents, spreadsheet, images, video, Web content, and the like) that are accessible to one or more users through IP network 518. For example, network share 544 may store content that is accessible by users located at one or more locations.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

What is claimed is:

1. A method for analyzing security alerts, comprising:
generating an enterprise graph based on information associated with an enterprise, wherein the enterprise graph identifies relationships between computers of the enterprise, wherein the relationships are based on an architecture and function performed in the enterprise;
receiving a first security alert produced by a first security component associated with a first computer of the enterprise;
receiving a second security alert produced by a second security component associated with a second computer of the enterprise;
based on the enterprise graph, determining a strength of a relationship between the first computer and the second computer, wherein the strength of the relationship is based on what type of machine the first computer is, what type of machine the second computer is and where the first computer is located in the enterprise, and where the second computer is located in the enterprise;
identifying a significant relationship between the first and second security alerts;
identifying a potential security incident based on the significant relationship between the first and second security alerts and based on the strength of the relationship between the first computer and the second computer;
ranking the first security alert, the second security alert, and a third security alert, wherein the third security alert is not associated with a potential security incident;
prioritizing the first security alert and the second security alert over the third security alert based on the association of the first security alert and the second security alert with the potential security incident;
presenting the first and second security alerts of the potential security incident as a chain of events, wherein the first security alert and the second security alert form the chain of events, which is compared to a criteria of attack to determine the security incident, and wherein the relationship helps define the chain of events; and
concluding that the potential incident is an actual attack.

2. The method of claim 1 further comprising examining the first and second security alerts associated with the potential security incident to identify a known part of an attack.

3. The method of claim 2 wherein examining the first and second security alerts associated with the potential security incident to identify the known part of the attack comprises: comparing a chain of events with a criteria for the attack.

4. The method of claim 1 further comprising generating a priority list of security incidents.

5. The method of claim 1 further comprising recommending the first and second security alerts of the potential security incident be given investigative priority.

6. The method of claim 1, wherein the strength of the relationship is based on two or more of a type of computer, a network and/or physical location of the first, second, and/or third computer, a physical distance and/or network connectivity between the first, second, and/or third computer, a same application executing on the first, second, and/or third computer, the first, second, and/or third computer performing a same function, a frequency of security alerts between the first, second, and/or third computer, and/or a type of security alert associated with the first, second, and/or third computer.

7. The method of claim 1 further comprising:
prioritizing a plurality of potential security incidents relative to one another based on the significant relationship, on a number of relationships, and/or on an identification as the security incident; and
generating a list of the plurality of potential security incidents ranked based on the priority.

8. The method of claim 1 wherein identifying the potential security incident based on the significant relationship between the first and second security alerts involves two or more computers of the enterprise.

9. The method of claim 1 wherein one of the first and second security alerts occurs as a result of detection of a known piece of malicious executable code at an entity and another of the first and second security alerts occurs as a result of receipt of the known piece of malicious executable code from another entity.

10. The method of claim 9 wherein the first security alert occurring as a result of detecting the known piece of malicious executable code and the second security alert occurring as a result of the receipt of the known piece of malicious executable code together result in the potential security incident.

11. The method of claim 1 wherein the first security alert alone, which corresponds with a detected known piece of malicious executable code, results in the potential security incident.

12. A system for analyzing security alerts, comprising:
an enterprise graph service, executed by a processor of a server associated with the enterprise, that generates an enterprise graph based on information associated with an enterprise for identifying relationships between computers of the enterprise, wherein the relationship are based on an architecture and function performed in the enterprise;
a first computer comprising:
a first memory; and
a first processor in communication with the first memory, wherein the first processor executes a first security component, wherein the first security component generates a first security alert regarding the enterprise;
a second computer comprising:
a second memory; and
a second processor in communication with the second memory, wherein the second processor executes a second security component, wherein the second security component generates a second security alert regarding the enterprise;
a server in communication with the first computer and the second computer, the server comprises:
a third memory; and
a third processor in communication with the third memory, wherein the third processor:
identifies a significant relationship, based on the enterprise graph, between the first security alert and the second security alert, wherein the significant relationship is identified in the enterprise graph and corresponds with at least the first security alert and the second security alert; and
executes a kill chain interpreter, wherein the kill chain interpreter:

identifies a potential security incident based on the significant relationship between the first security alert and the second security alert and based on a strength of the relationship between the first computer and the second computer;

ranks the first security alert, the second security alert, and a third security alert, wherein the third security alert is not associated with the potential security incident;

prioritizes the first security alert and the second security alert over the third security alert based on identifying the first security alert and the second security alert with the potential security incident;

presents the first and second security alerts of the potential security incident as a chain of events, wherein the first security alert and the second security alert form the chain of events, which is compared to a criteria of attack to determine the security incident, and wherein the relationship helps define the chain of events; and concludes that the potential security incident is an actual attack.

13. The system of claim 12 further comprising a list prioritizing the first and second security alerts corresponding with the potential security incident identified by the kill chain interpreter.

14. The system of claim 12 further comprising a recommendation that the first and second security alert of the potential security incident be given priority over the third security alert not associated with any other identified potential security incident.

15. The system of claim 12 further comprising a list of prioritized potential security incidents.

16. The system of claim 12 wherein the potential security incident based on the significant relationship between the first security alert and the second security alert involves two or more computers of the enterprise.

17. The system of claim 12 wherein the first security alert occurs as a result of detection of a known piece of malicious executable code at an entity and the second security alert occurs as a result of receipt of the known piece of malicious executable code from another entity, and the first and second security alerts together result in the potential security incident.

18. A non-transitory computer-readable storage medium including instructions for analyzing security alerts, which when executed by a processor are operable to execute a method, the method comprising:

generating an enterprise graph based on information associated with an enterprise, wherein the enterprise graph identifies relationships between computers of the enterprise, wherein the relationships are based on an architecture and function performed in the enterprise;

receiving a first security alert produced by a first security component associated with a first computer of the enterprise;

receiving a second security alert produced by a second security component associated with a second computer of the enterprise;

based on the enterprise graph, determining a strength of a relationship between the first computer and the second computer;

identifying a significant relationship between the first and second security alerts and based on the strength of the relationship between the first computer and the second computer;

identifying a potential security incident based on the significant relationship between the first and second security alerts;

ranking the first security alert, the second security alert, and a third security alert, wherein the third security alert is not associated with a potential security incident;

prioritizing the first security alert and the second security alert over the third security alert based on identifying the first security alert and the second security alert with the potential security incident;

presenting the first and second security alerts of the potential security incident as a chain of events, wherein the first security alert and the second security alert form the chain of events, which is compared to a criteria of attack to determine the security incident, and wherein the relationship helps define the chain of events; and concluding that the potential security incident is an actual attack.

* * * * *